May 8, 1923.
J. KUTTNER
COMPOSITE ROLLER BEARING
Filed March 13, 1918
1,454,057
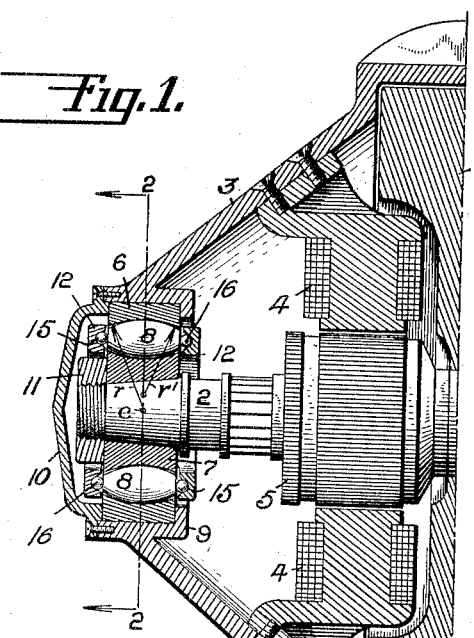
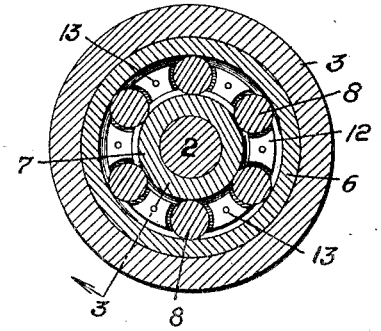
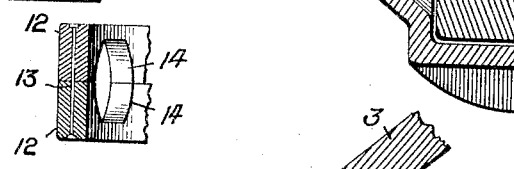
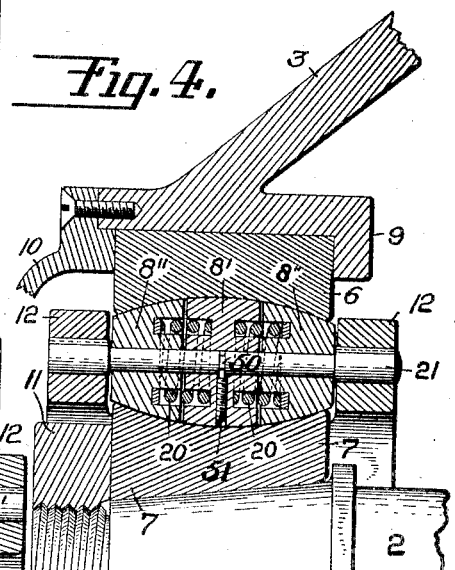
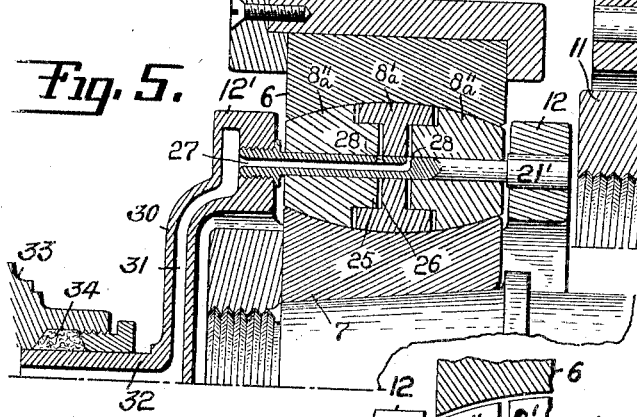
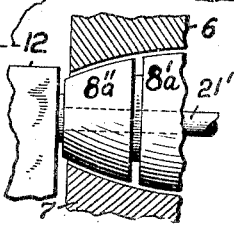
INVENTOR
Julius Kuttner
BY
Herbert H. Thompson
ATTORNEY Patented May 8, 1923.

1,454,057

UNITED STATES PATENT OFFICE.

JULIUS KUTTNER, OF NEW YORK, N. Y., ASSIGNOR TO THE SPERRY GYROSCOPE COMPANY, OF BROOKLYN, NEW YORK, A CORPORATION OF NEW YORK.

COMPOSITE ROLLER BEARING.

Application filed March 13, 1918. Serial No. 222,061.

*To all whom it may concern:*

Be it known that I, JULIUS KUTTNER, a citizen of the United States of America, residing at 567 West 113th Street, New York, in the county of New York and State of New York, have invented certain new and useful Improvements in Composite Roller Bearings, of which the following is a specification.

This invention relates to anti-friction bearings, more specifically to roller bearings designed to carry heavy loads.

At present anti-friction bearings may be grouped in two classes, i. e. ball bearings and roller bearings. The former, while advantageous in certain respects, is limited in its load carrying capacity due to the comparatively small surface of contact between the ball and races. While this degree of contact may be increased by increasing the diameter of the balls, this procedure cannot be carried on indefinitely, due to the limit imposed by the permissible size of the bearing and effect of centrifugal force on the balls. Roller bearings having cylindrical rollers, on the other hand, are capable of carrying a heavy load when working properly, i. e. when there is a line contact between each roller and its race or races. This line contact exists, however, only when the surfaces are absolutely true and when the longitudinal axes of the rollers maintain a constant angular relationship with respect to the axis of the bearing. Thus, when the longitudinal axes of the rollers twist, the contact is no longer line contact but point contact of such a nature as to produce scoring of the rollers and consequently the bearing becomes practically inoperative.

The principal object of the present invention is to provide a bearing possessing the advantages of both the ball and cylindrical roller types without the objectionable features of either of the latter.

Referring to the drawings which illustrate what I now consider the preferred forms of my invention,—

Figure 1 is a sectional elevation of one form of my bearing as applied to a stabilizing gyroscopic rotor;

Fig. 2 is a section taken on the line 2—2 of Fig. 1;

Fig. 3 is a fragmentary sectional detail view taken on the line 3 of Fig. 2;

Figs. 4 and 5 are fragmentary sectional elevations of two modified forms of bearings.

Fig. 6 is a fragmentary detail, partly in section illustrating the position of the parts on the slack side of the bearing shown in Fig. 5.

While my improved bearing is capable of supporting any heavy rotating part, I have illustrated it in connection with a gyroscopic rotor 1 of the ship stabilizing type. The latter is shown as secured to shaft 2 adapted to rotate in a frame or casing 3. The rotor 1 may be driven by means of an armature 5 secured to the shaft 2, said armature constituting a part of an electric motor, the fields 4, 4 of which are shown secured to the casing 3.

Each bearing, one only being shown in Fig. 1, comprises an outer race 6 and an inner race 7. The former is shown clamped between an annular shoulder 9, on casing 3, and an end plate 10 detachably secured to said casing. The race 7 is shown secured to shaft 2, a conical seat being provided on the latter for that purpose, said race 7 being securely held in position by means of a nut or other suitable means 11. In order to make the bearings self-aligning I prefer to curve the inner surface of the outer race 6 as illustrated in Fig. 1, i. e. to shape said surface in the form of a portion of a sphere centered at $c$, the centre of the bearing. The outer surface of the inner race 7 is so formed that the curve formed by the intersection of any plane through the axis of shaft 2 and said outer surface has the same radius of curvature as the inner surface of race 6. The rollers 8 are neither ball shaped or cylindrical but are, what may be termed, barrel-shaped. To be more specific, each roller is so formed that cross-sections on planes perpendicular to its longitudinal axis are circular, the lateral surface being a portion of the surface formed by revolving an arc of less than 180°, of a circle about its chord. Referring to Figure 1 it will be seen that the radius of curvature $r'$ of the lateral arc of each roller is slightly less than the radius of curvature $r$ of the inner surface of the outer race 6. While the rollers 8 do not give a line contact it is obvious that the degree of contact is very much higher than that of a ball of the same mass.

A suitable cage may be provided in order to constrain the rollers 8 to movement such that their longitudinal axes maintain a substantially parallel relationship with respect to the axis of shaft 2. One form of such a cage is shown in Figs. 1, 2 and 3 as comprising a pair of annular members or rings 12 adapted to extend into the annular space between the races and each provided with cutaway portions 14 to clear the rollers 8. The rings 12, 12 may be secured to each other in any suitable manner, as by means of through bolts 13. In Fig. 1 the rings 12 are shown provided with oppositely located depressions 15 which together with depressions at the ends of rollers 8 form seats for balls 16.

In addition to the advantages already pointed out it will be seen that if for any reason the rollers 8 skew around the degree of contact is reduced but slightly as compared to the reduction produced by skewing of a cylindrical roller. If desirable the degree of contact between the rollers 8 and the races 6, 7 may be increased still more, without producing objectionable scoring due to skewing, by making each roller in a plurality of sections and providing yielding means tending to spread the sections in directions parallel to their longitudinal axes and away from the centers of each roller. This may be accomplished in various ways, two being illustrated in Figs. 4 and 5.

Calling attention to Fig. 4 it will be seen that each roller 8 comprises a central section 8' and end sections 8'' each loosely mounted on the reduced central portions of a rod or shaft 21 keyed to rings 12, 12. Springs 20 may be provided between adjacent sections for the purpose of spreading the latter.

The form of the invention shown in Fig. 5 is similar to that of Fig. 4 in that each roller 8 comprises three sections 8'ᵃ, 8''ᵃ, but instead of utilizing springs to spread the sections, fluid pressure means is employed. For this purpose the central section 8'ᵃ is provided on opposite sides with a cylindrical recess 26 adapted to receive piston members 25 formed on sections 8''ᵃ. Each rod 21' is provided with a central bore 27 terminating adjacent the middle of said rod in openings 28, whereby fluid under pressure may be introduced into each cylinder 26. One of the ends of each rod 21' instead of being keyed to a ring 12 is screwed into a modified form of ring indicated at 12'. The latter is similar to rings 12 already described but is provided in addition with a central disk portion 30 and a central tubular extension 32. The tube 32 communicates with the passages 27 through a passage or passages 31. The tube 32 is rotatably connected to a tank, or other source, of fluid under pressure 33, packing 34 being provided to prevent leakage.

If desirable, when the sectionalized type of roller is employed, the central section may be held against axial translation with respect to its rod by any suitable means. Thus in Fig. 4 I have shown a peripheral groove 50 on the rod 21 in which the end of a set-screw 51, radially tapped into section 8', may engage. This arrangement will permit rotation but will prevent axial translation of said section 8'.

Preferably the design of the parts, in the form shown in Figs. 4 and 5, is such that the end sections 8'' and 8''ᵃ will be held out of engagement with the races by abutting the shoulders on rods 21 and 21' when the particular roller of which said sections are a part is on the slack side of the bearing. (See Fig. 6.)

It will be noted that each of the rollers shown in Figs. 1, 4 and 5 is in the form of a circular spindle, truncated for convenience in mounting and to save material. I use the expression "circular spindle" in its geometrical sense, i. e. to designate a solid generated by the revolution of an arc of a circle about its chord. In the form shown in Fig. 1 the radius of curvature of the generating arc of each spindle is less than those of the race surfaces so that the rollers need not be sectionalized to allow relative rotation of axially spaced points on the surface of the spindles. In the forms shown in Figs. 4 and 5, however, the radius of curvature of the spindle generating arc is the same as those of the generating arcs of the race surfaces. In short, there is a long curve-line contact between the spindles and races so that some provision must be made, to reduce sliding friction, to permit relative rotation of axially spaced sections of the spindles. The sectionalizing of the spindles as shown in the last mentioned figures, and already described, permits this relative rotation.

My improved bearing, as previously pointed out, possesses a high degree of contact under all operating conditions, is self-aligning and in addition is capable of carrying considerable thrusts thus accomplishing the function of a thrust bearing, as well as a radial one.

Having described my invention, what I claim and desire to secure by Letters Patent is:

1. A composite roller bearing comprising races, a plurality of barrel-shaped rollers mounted between said races, each of said rollers comprising a plurality of relatively rotatable sections, and means for spreading said sections.

2. A composite roller bearing comprising races, a plurality of barrel-shaped rollers mounted between said races, each of said rollers comprising a plurality of relatively rotatable sections, and yielding means for spreading said sections.

3. A composite roller bearing comprising races, a plurality of barrel-shaped rollers mounted between said races, each of said rollers comprising a plurality of relatively rotatable sections, and means for exerting fluid pressure between said sections for spreading the same.

4. A composite roller bearing comprising races, a plurality of barrel-shaped rollers mounted between said races, each of said rollers comprising a plurality of relatively rotatable sections, and means for exerting hydraulic pressure between the sections of each spindle.

In testimony whereof I have affixed my signature.

JULIUS KUTTNER.